United States Patent [19]

Ikeno

[11] Patent Number: 5,043,882

[45] Date of Patent: Aug. 27, 1991

[54] INTERRUPT CONTROLLER FOR MULTIPROCESSOR SYSTEMS

[75] Inventor: Motokiyo Ikeno, Tokyo, Japan

[73] Assignee: NEC Corporation, Tokyo, Japan

[21] Appl. No.: 489,387

[22] Filed: Mar. 5, 1990

[30] Foreign Application Priority Data

Mar. 3, 1989 [JP] Japan ................................. 1-50095

[51] Int. Cl.⁵ .......................... G06F 15/16; G06F 9/46
[52] U.S. Cl. ................................ 364/200; 364/230.2;
364/243.2; 364/263.3; 364/260.1; 364/241.5;
364/273.4; 364/264; 364/941.1; 364/964.3;
364/900
[58] Field of Search ................. 364/200, 900, 371, 340

[56]     References Cited
U.S. PATENT DOCUMENTS

| 3,801,962 | 4/1974 | Moore et al. | 340/172.5 |
| 4,253,146 | 2/1981 | Bellamy et al. | 364/200 |
| 4,271,468 | 1/1981 | Christensen et al. | 364/200 |
| 4,644,465 | 2/1987 | Imamura | 364/200 |

Primary Examiner—Michael R. Fleming

Assistant Examiner—Robert S. Hauser
Attorney, Agent, or Firm—Sughrue, Mion, Zinn, Macpeak & Seas

[57]     ABSTRACT

In a multiprocessor system, a request from a processor for data transfer between an external mass storage unit and a main memory is granted and a report indicating an event is supplied from the external storage unit if there is one to report. An event decoder decodes the reported event and makes a first decision if it is a sync-related event resulting from the execution of an instruction and makes a second decision if it is a sync-unrelated event irrelevant to execution of instructions. One of the processors except for the granted processor is selected as a master processor to be interrupted when a sync-unrelated event occurs. An interrupt generator supplies an interrupt to the request-granted processor when the first decision is made by the decoder or supplies it to the selected master processor if the second decision is made. When an event such as overvoltages and high temperatures occur during data transfer, the processor requesting such transfer is prevented from being indiscriminately interrupted.

15 Claims, 3 Drawing Sheets

FIG. 2

| REQUESTING PROCESSOR | REGISTER 11 OUTPUTS | | | |
|---|---|---|---|---|
| | #1 | #2 | #3 | #4 |
| PROCESSOR 2-0 | 1 | 0 | 0 | 0 |
| PROCESSOR 2-1 | 0 | 1 | 0 | 0 |
| PROCESSOR 2-2 | 0 | 0 | 1 | 0 |
| PROCESSOR 2-3 | 0 | 0 | 0 | 1 |

Legend: Bit position with "1" indicates processor to which data transfer request is granted

FIG. 3

| REPORTED EVENT | EVENT STATUS REGISTER 12 | | | EVENT DCDR 13 OUTPUTS | |
|---|---|---|---|---|---|
| | #1 | #2 | #3 | 13-1 | 13-2 |
| NO EVENTS REPORTED | 0 | 0 | 0 | 0 | 0 |
| ERROR WITHIN EXTERNAL STORAGE UNIT 4 | 0 | 0 | 1 | 1 | 0 |
| ERROR IN INTERFACE 5 | 0 | 1 | 0 | 1 | 0 |
| POWER ON OR OFF | 0 | 1 | 1 | 1 | 1 |
| OVERVOLTAGE | 1 | 0 | 0 | 1 | 1 |
| HIGH TEMPERATURE | 1 | 0 | 1 | 1 | 1 |

INTERRUPT CONTROLLER FOR MULTIPROCESSOR SYSTEMS

BACKGROUND OF THE INVENTION

The present invention relates generally to multiprocessor systems, and more specifically to data transfer between a main memory and an external storage unit of a multiprocessor system.

With current multiprocessor systems, each processor receives a report from an external mass storage unit whenever an event, such as data transfer error, interface error, power turn-on or turn-off, overvoltage, and an abnormal temperature condition occurs, and interrupts its job without paying attention to whatever kind of the report it has received or to whatever kind of job it is currently processing. This indiscriminate interrupt scheme results in an increase in the processor overhead, and hence a decrease in the overall efficiency of a multiprocessor system.

SUMMARY OF THE INVENTION

It is therefore an object of the present invention to provide an interrupt controller for a multiprocessor system which reduces processor overheads.

According to the present invention, there is provided an interrupt controller for a multiprocessor system in which each processor is identified by a unique processor identification number. An external mass storage unit generates a report whenever an event occurs in the system. The interrupt controller comprises a request controller for granting permission to a request issued from one of the processors for transfer of data between the external storage unit and a main memory. The request controller then issues a transfer command to both the external storage unit and the main memory, allowing the mass storage unit to return a report. A processor identifier register is provided for storing the identification number of the processor whose request is granted. An event decoder decodes the reported event and makes a first decision that the reported event is a sync-related event generated as a result of execution of an instruction or makes a second decision that the reported event is a sync-unrelated event irrelevant to execution of instructions. A processor selector is provided for selecting one of the processors. An interrupt generator is responsive to the first decision of the decoder for supplying an interrupt command to a processor identified by the identification number stored in the processor identifier register and responsive to the second decision for supplying an interrupt command to a processor selected by the processor selector. Therefore, when a sync-unrelated event such as overvoltages and high temperatures occur during data transfer request, the requesting processor is prevented from being indiscriminately interrupted, thus reducing the processor overhead, and an idle processor with a least identification number, which is usually assigned to a master processor, is interrupted.

BRIEF DESCRIPTION OF THE DRAWINGS

The present invention will be described in further detail with reference to the accompanying drawings, in which:

FIG. 2 shows details of the granted processor ID register of FIG. 1;

FIG. 3 shows details of the event status register and event decoder of FIG. 1.

DETAILED DESCRIPTION

Figure 1:
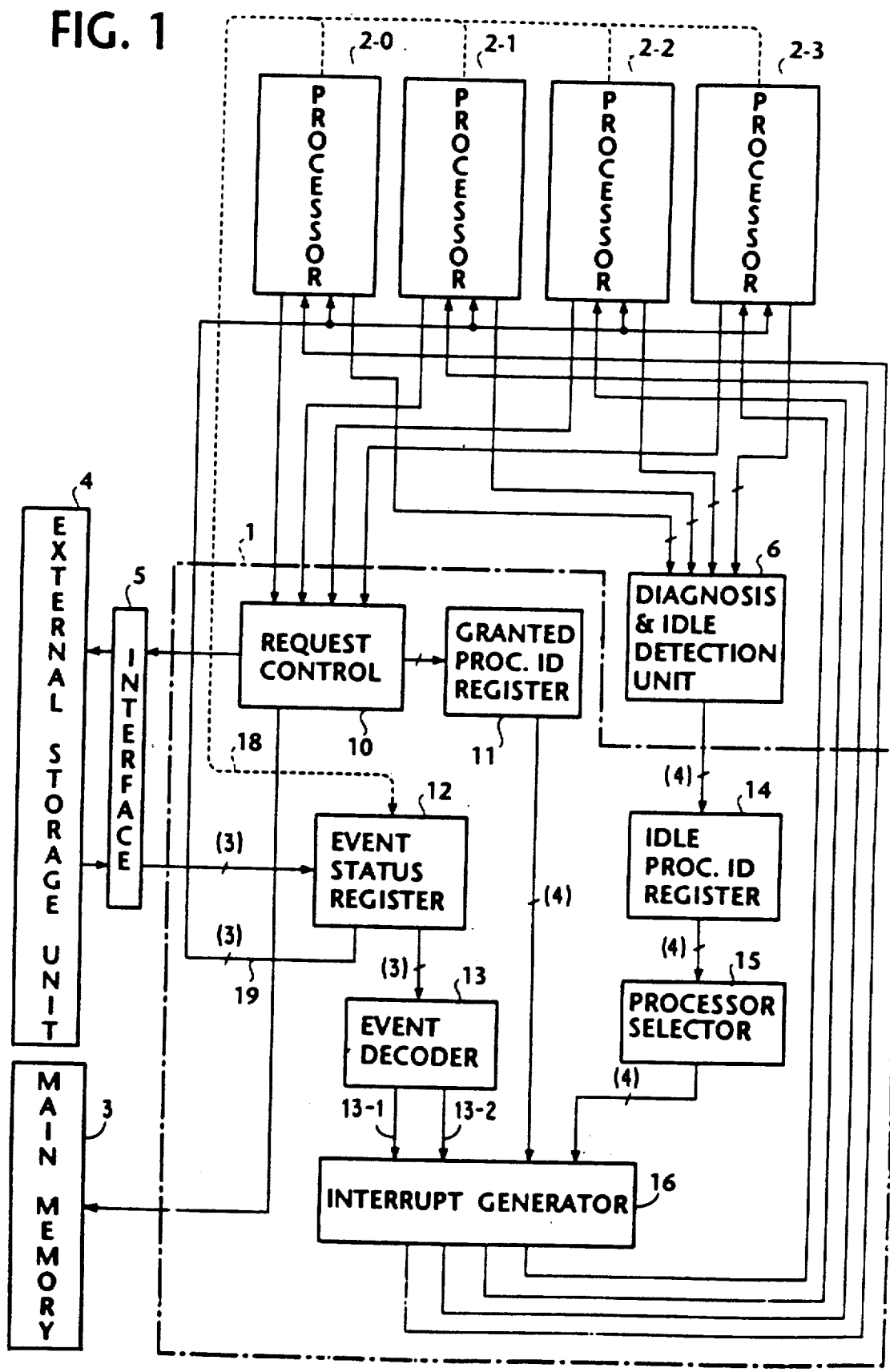
FIG. 1 is a block diagram of a multiprocessor system embodying the present invention.

Referring now to FIG. 1, there is shown a multiprocessor system embodying the present invention. The system generally comprises an interrupt controller 1, processors 2-0-2-3, a main memory 3 and an external mass storage unit 4. Interrupt controller 1 has a request controller 10 which receives signals from processors 2 requesting data transfer between main memory 3 and mass storage unit 5 and grants permission to only one processor having top priority and holds other requests if there is more than one data transfer request. The identification number of the granted processor is stored into a granted processor ID register 11.

As shown in FIG. 2, register 11 has four bit positions respectively corresponding to processors 2-2-2-3 and the setting of a "1" in a position of register 11 indicates that a request is granted to the processor corresponding to that position. Request controller 10 is further connected to main memory 3 and mass storage unit 4. When a data transfer request is granted to a processor, request controller 10 issues a transfer enable signal to mass storage unit 4 by way of an interface 5 and to main memory 3 to cause data to be transferred between them through an interconnection channel or bus system, not shown.

Interrupt controller 1 includes an event status register 12 which is connected to mass storage unit 4 through interface 5 to receive a 3-bit code indicating the status of an event reported from mass storage unit 4. The event stored in register 12 is decoded by an event decoder 13 having output terminals 13-1 and 13-2. A "1" on output terminal 13-1 indicates that an interrupt command must be generated, and a "0" on output terminal 13-2 indicates a sync-related event and a "1" on that terminal indicates a sync-unrelated event.

As shown in FIG. 3, all zero bits indicate that no event is reported from storage unit 4. The sync-related event includes errors that occur within mass storage unit 4 and in interface 5, while the sync-unrelated event includes such events as power turn-on or turn-off, overvoltage and abnormally high temperature. The error event within mass storage unit 4 is represented by a code "001", which is interpreted by decoder 13 as a sync-related event and translated so that a "1" and a "0" appear on output terminals 13-1 and 13-2, respectively. The interface error event is represented by a code "010" which is translated by decoder 13 into a "1" and a "0" appearing respectively on terminals 13-1 and 13-2 as in the case of errors in mass storage unit 4. The power turn-on and turn-off event is represented by a code "011" and the overvoltage event by a code "100". The high temperature event is represented by a code "101". Each of these sync-unrelated events is translated by decoder 13 into a 1 appearing on each of the output terminals 13-1 and 13-2.

The multiprocessor system further includes a diagnosis and idle detection unit 6 which is connected to all processors through multibit buses to constantly check their operating states to generate a 4-bit output. If all processors are working normally and remain idle, all four bits of the output of diagnosis and idle detection unit 6 are "1111," if one processor should fail or begins executing a job, a "0" is set in the corresponding position and the failed or executing processor is removed from a list of idle processors.

The output of diagnosis and idle detection unit 6 is stored into an idle processor ID register 14 as a list of idle processors. An idle processor selector 15 is connected to the register 14 to select one of the idle processors having a least identification number which is usually assigned to a master processor. For example, if processor 2-0 should fail, diagnosis unit 6 generates an output "0111" and selector 15 selects processor 2-1 since the identification number thereof is the least among the idle processors. A 4-bit output is generated by selector 15 indicating a selected idle processor.

Figure 4:
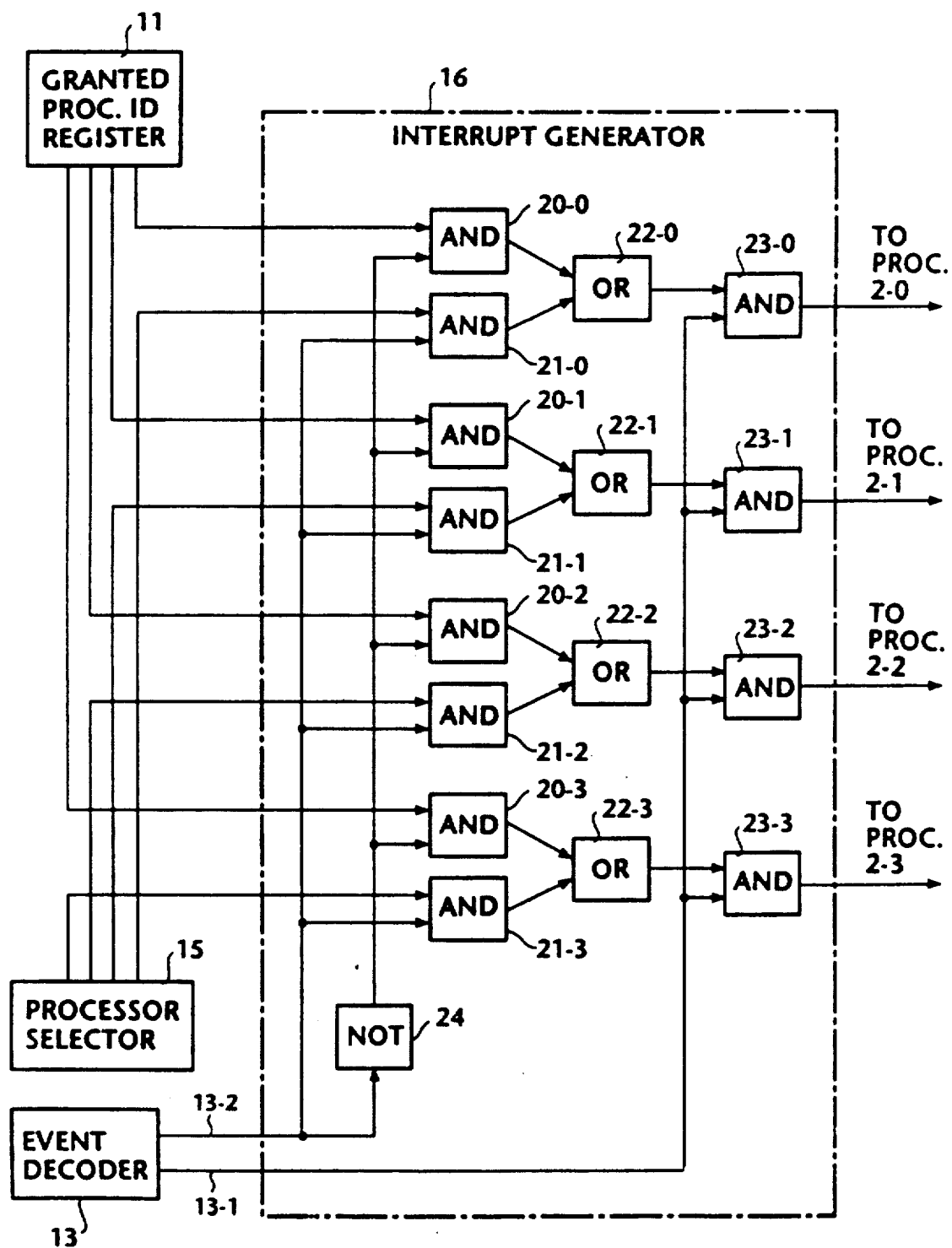
FIG. 4 shows details of the interrupt generator of FIG. 1.

The outputs of register 11, decoder 13 and selector 15 are all supplied to an interrupt generator 16. According to the logic level of the output 13-2 of decoder 13, interrupt generator 16 selects one of the outputs of register 11 and selector 15 and supplies an interrupt command to a processor which may be the granted processor in the case of a sync-related event or the selected idle processor in the case of a sync-unrelated event. As shown in detail in FIG. 4, interrupt generator 16 comprises AND gates 20-0-20-3 which are connected respectively to the output terminals of granted PID register 11 and are enabled in response to a "1" from a NOT gate 24 connected to the output terminal 13-2 of decoder 13. The outputs of processor selector 15 are supplied respectively to AND gates 21-0-21-3 which are enabled in response to a "1" on the output terminal 13-2. The outputs of AND gates 20-0-20-3 are connected respectively to OR gates 22-0-22-3 whose outputs are respectively connected to AND gates 23-0-23-3, and those of AND gates 21-0-21-3 are likewise connected to OR gates 22-0-22-3. AND gates 23-0-23-3 are enabled in response to an interrupt command bit "1" on output terminal 13-1, the outputs of AND gates 23-0-23-3 being respectively connected to processors 2-0-2-3.

Since output terminal 13-2 is "0" for sync-related events and "1" for sync-unrelated events, a "1" appears at the output of one of AND gates 20-0-20-3 if a sync-event is reported from mass storage unit 4, or a "1" appears at the output of one of AND gates 21-1-21-3 if a sync-unrelated event is reported. The "1" output from an AND gate 20 or 21 is applied through an OR gate 22 to a corresponding AND gate 23 which, when enabled, supplies an interrupt command signal to an appropriate processor.

Therefore, a processor executing a job in a data transfer mode is interrupted only when an error occurs in the mass storage unit 4 or interface 5, and a master processor is interrupted only when a sync-unrelated event occurs in the system.

On receiving an interrupt command signal, processors 2-0-2-3 interrupt their executing job and proceed to access the event status register 12 through an access route which may be established by software control as indicated by a dotted line 18. The interrupted processor reads the contents of event status register 12 through a 3-bit bus 19 and enters an emergency subroutine according to the status read out of register 12.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An interrupt controller for a multiprocessor system, wherein the system includes a plurality of processors each being identified by a unique processor identification number, a main memory and an external storage unit which generates a report indicating the occurrence of an event, comprising:

request granting means coupled to said processors, said external storage unit and said main memory for granting permission to a request issued from one of said processors for transfer of data between said external storage unit and said main memory, and issuing a transfer command signal to said external storage unit and said main memory when said request is granted, thereby causing said storage unit to return said report;

processor identifier register means coupled to said request granting means for storing the identification number of the processor whose request is granted;

event decoder means coupled to said external storage unit for making a first decision if the event reported from said external storage unit is a sync-related event occurring as a result of execution of an instruction and making a second decision if said event is a sync-unrelated event irrelevant to execution of instructions;

processor selector means coupled to said processors for selecting one of said processors; and interrupt generator means coupled to said event decoder means, said processor identifier register means and said processor selector means, said interrupt generator means being responsive to said first decision for supplying an interrupt command to a processor identified by the identification number stored in said processor identifier register means and responsive to said second decision for supplying an interrupt command to a processor selected by said processor selector means.

2. An interrupt controller as claimed in claim 1, wherein said event decoder means includes means coupled to said external storage unit and said processors for storing said event reported from said external storage unit, said stored event being readable by one of said processors to which said interrupt command is supplied from said interrupt generator means.

3. An interrupt controller as claimed in claim 1, wherein said processor selector means includes diagnostic means coupled to said processors for detecting one or more of said processors which are functioning properly, and selector means coupled to said diagnostic means for selecting one of said properly functioning processors.

4. An interrupt controller as claimed in claim 3, wherein said diagnostic means further detects one or more of said properly functioning processors which are not executing a job, and said selector means selects one of the detected normally functioning processors not executing the job.

5. An interrupt controller as claimed in claim 3, wherein said selector means selects one of said properly functioning processors having a processor identification number which is the least of the processor identification numbers of said properly functioning processors.

6. An interrupt controller as claimed in claim 4, wherein said selector means selects one of said properly functioning processors having a processor identification number which is the least of the processor identification numbers of said properly functioning processors which are detected as not executing a job.

7. An interrupt controller as claimed in claim 1, wherein said event decoder means detects errors associated with transfer of data in response to said data transfer request as said sync-related event.

8. A multiprocessor system operating with an external mass storage unit which generates a report indicating the occurrence of an event, comprising:
 a plurality of processors each being identified by a unique processor identification number;
 a main memory;
 request granting means coupled to said processors said external mass storage unit and said main memory for granting permission to a request issued from one of said processors for transfer of data between said external mass storage unit and said main memory, and issuing a transfer command signal to said external mass storage unit and said main memory when said request is granted, thereby causing said external mass storage unit to return said report;
 processor identifier register means coupled to said request granting means for storing the identification number of the processor whose request is granted;
 event decoder means coupled to said external mass storage unit for making a first decision if the event reported from said external storage unit is a sync-related event occurring as a result of execution of an instruction and making a second decision if said event is a sync-unrelated event irrelevant to execution of instructions;
 processor selector means coupled to said processors for selecting one of said processors except for said processor granted by said request granting means; and
 interrupt generator means coupled to said event decoder means, said processor identifier register means and said processor selector means, said interrupt generator means being responsive to said first decision for supplying an interrupt command to a processor identified by the identification number stored in said processor identifier register means and responsive to said second decision for supplying an interrupt command to a processor selected by said processor selector means.

9. A multiprocessor system as claimed in claim 8, wherein said event decoder means includes means coupled to said external mass storage unit and said processors for storing said event reported from said external mass storage unit, said stored event being readable by one of said processors to which an interrupt command is supplied from said interrupt generator means.

10. A multiprocessor system as claimed in claim 8, wherein said processor selector means includes diagnostic means for detecting one or more of said processors which are functioning properly, and selector means coupled to said diagnostic means for selecting one of said properly functioning processors.

11. A multiprocessor system as claimed in claim 10, wherein said diagnostic means further detects one or more of said properly functioning processors which are not executing a job, and said selector means selects one of the properly functioning processors detected as not executing the job.

12. A multiprocessor system as claimed in claim 10, wherein said selector means selects one of said properly functioning processors having a processor identification number which is the least of the processor identification numbers of said properly functioning processors.

13. A multiprocessor system as claimed in claim 11, wherein said selector means selects one of said properly functioning processors having a processor identification number which is the least of the processor identification numbers of said properly functioning processors which are detected as not executing the job.

14. A multiprocessor system as claimed in claim 8, wherein said event decoder means detects errors associated with transfer of data in response to said data transfer request as said sync-related event.

15. A method for interrupting one of a plurality of processors of a multiprocessors system, wherein each of said processors is identified by a unique processor identification number, and the system includes a main memory and an external storage unit which generates a report indicating the occurrence of an event, comprising:
 a) granting permission to a request issued from one of said processors for transfer of data between said external storage unit and said main memory, and issuing a transfer command signal to said external storage unit and said memory when said request is granted, thereby causing said storage unit to return said report;
 b) making a first decision if the event reported from said external storage unit is a sync-related event occurring as a result of execution of an instruction and making a second decision if said event is a sync-unrelated event irrelevant to execution of instructions;
 c) selecting one of said processors except for the processor to which said permission is granted; and
 d) if said first decision is made by the step (b), supplying an interrupt command to the processor whose request for data transfer is granted by the step (a) and if said second decision is made by step (b), supplying an interrupt command to the processor selected by the step (c).

* * * * *